US009553776B2

United States Patent
Geffin

(10) Patent No.: US 9,553,776 B2
(45) Date of Patent: Jan. 24, 2017

(54) SYSTEM AND METHOD FOR ACCESSING OPERATING SYSTEM AND HYPERVISORS VIA A SERVICE PROCESSOR OF A SERVER

(75) Inventor: Steven Geffin, Miami, FL (US)

(73) Assignee: AVOCENT HUNTSVILLE, LLC, Huntsville, AL (US)

(*) Notice: Subject to any disclaimer, the term of this patent is extended or adjusted under 35 U.S.C. 154(b) by 251 days.

(21) Appl. No.: 14/117,908

(22) PCT Filed: May 16, 2012

(86) PCT No.: PCT/US2012/038093
§ 371 (c)(1),
(2), (4) Date: Nov. 15, 2013

(87) PCT Pub. No.: WO2012/158765
PCT Pub. Date: Nov. 22, 2012

(65) Prior Publication Data
US 2014/0082142 A1   Mar. 20, 2014

Related U.S. Application Data

(60) Provisional application No. 61/486,482, filed on May 16, 2011.

(51) Int. Cl.
G06F 15/16 (2006.01)
H04L 12/24 (2006.01)
G06F 11/30 (2006.01)
G06F 9/455 (2006.01)
G06F 13/38 (2006.01)

(52) U.S. Cl.
CPC .......... *H04L 41/32* (2013.01); *G06F 9/45558* (2013.01); *G06F 11/3055* (2013.01); *G06F 13/385* (2013.01)

(58) Field of Classification Search
None
See application file for complete search history.

(56) References Cited

U.S. PATENT DOCUMENTS 6,636,929 B1 * 10/2003 Frantz ................ G06F 11/0709
                                                        710/104
8,090,819 B1 *  1/2012 Ramamurthy ......... H04L 12/24
                                                        709/224

(Continued)

OTHER PUBLICATIONS

International Search Report and Written Opinion for PCT/US2012/038093, mailed Dec. 26, 2012; ISA/KR.

*Primary Examiner* — Joseph E Avellino
*Assistant Examiner* — Phyllis A Book
(74) *Attorney, Agent, or Firm* — Harness, Dickey & Pierce, P.L.C.

(57) ABSTRACT

The present disclosure relates to a server that makes use of a host central processing unit (CPU) which accesses a production network to enable communications with a remotely located subsystem using the production network. A USB host system may be operably associated with the host CPU. A service processor may also be incorporated in the server, which is configured to communicate with an out of band network. A service processor USB system may be operably associated with the service processor and may communicate with the USB host system. This enables access to either an operating system or a hypervisor running on the host CPU via the out of band network, using an Ethernet-over-USB protocol.

19 Claims, 3 Drawing Sheets

(56) References Cited

U.S. PATENT DOCUMENTS

| | | | |
|---|---|---|---|
| 2002/0044663 A1* | 4/2002 | King | G06K 13/085 380/284 |
| 2002/0091869 A1* | 7/2002 | Jones | G06F 11/2736 719/310 |
| 2004/0030413 A1* | 2/2004 | King | G06F 1/24 700/1 |
| 2007/0124474 A1* | 5/2007 | Margulis | G06F 3/14 709/226 |
| 2007/0152058 A1* | 7/2007 | Yeakley | G06F 17/2247 235/462.01 |
| 2007/0168498 A1* | 7/2007 | Lambert | H04L 67/38 709/224 |
| 2008/0288704 A1* | 11/2008 | Diab | H04L 12/2805 710/305 |
| 2008/0316024 A1* | 12/2008 | Chantelou | G08B 25/10 340/539.17 |
| 2009/0006859 A1* | 1/2009 | Zimmer | G06F 21/575 713/186 |
| 2009/0307702 A1* | 12/2009 | Watkins | G06F 12/1441 718/104 |
| 2010/0011178 A1 | 1/2010 | Feathergill | |
| 2010/0014526 A1 | 1/2010 | Chavan et al. | |
| 2010/0058335 A1* | 3/2010 | Weber | G06F 9/45533 718/1 |
| 2010/0180284 A1 | 7/2010 | Ross | |
| 2011/0179203 A1* | 7/2011 | Galloway | G06F 13/385 710/74 |
| 2011/0225446 A1* | 9/2011 | Lindeman | G06F 11/0751 714/2 |

\* cited by examiner

SYSTEM AND METHOD FOR ACCESSING OPERATING SYSTEM AND HYPERVISORS VIA A SERVICE PROCESSOR OF A SERVER

CROSS-REFERENCE TO RELATED APPLICATIONS

This application is a 371 U.S. National Stage of PCT International Application No. PCT/US2012/038093, filed on May 16, 2012, which claims the benefit of U.S. Provisional Patent Application No. 61/486,482 filed on May 16, 2011. The entire disclosures of the above applications are incorporated herein by reference.

FIELD

The present disclosure relates to systems and methods for communicating with servers operating within a data center, and more particularly to a system and method for enabling communication with a service processor of the server processor, via an out of band connection, to allow access and control over an operating system or Hypervisor running on the server.

BACKGROUND

The statements in this section merely provide background information related to the present disclosure and may not constitute prior art.

Present day servers (e.g., storage and blade servers) almost always incorporate a "service processor". A service processor typically is a microcontroller embedded in the server or a server blade chassis, and used for remote management purposes. Frequently the service processor is located on a motherboard of a server or on a PCI card. The service processor is completely independent from the main CPU and the system operating system of the server. Thus, it is able to operate fully independently of the server's CPU and operating system, even if the server's CPU or operating system is locked up or otherwise inaccessible. Service processors are often used to perform one or more of following valuable functions/operations:
Power Management
Report Status (On/Off)
Report Consumption (Volts & Amps)
Control (On, Off, Reboot)
Thermal Management
Read Temperatures
Control Fan Speeds based on temperatures
Report fan failures (fan(s) not running at the correct speed)
Sensor Monitoring—Intrusion Alarm, etc.
Remote Console
Serial Port redirection via telnet/SSH
Remote Keyboard/Video/Mouse over IP
Remote Media—Ability to attach remote storage devices as emulated
USB devices
Log system events such as operating system (OS) crash, system boot
Configurable behaviors for system events such as alert generation and system shutdown
System Inventory—read Field Replaceable Unit (FRU) EEPROMs, PCI devices
More specifically, one or more of the following functionalities may be provided using a service processor:

Remote power control—Servers can be remotely powered off, on, or cycled through service processors. This is one of the most useful features of service processors. Remote power control is used to restore servers that are locked up, to power down overheated servers, or to perform any other function that requires low-level interaction with the server.

Graceful shutdown support—Certain service processors support a remote power control command that actually sends a signal to the server operating system to shut down gracefully before actually power cycling or turning off the server. This prevents the possible effects of a "brute force" power cycle or shutdown, such as data corruption in the server hard drives and other undesirable outcomes.

Remote SoL console access—The server console can be accessed through the Ethernet interface of its service processor by using a standard telnet or Secure Shell (SSH) client in the same way it would be available through a regular serial port. If the server supports BIOS redirection to the serial port (which is usually the case with servers equipped with service processors), a user can have full access to the server console from the time it is booted up, through the BIOS and all the way up to the OS login prompt. This is very useful for remote troubleshooting.

Health monitoring—Service processors communicate with the appropriate sensor hardware in the server (e.g., fan speed monitors, voltage meters and temperature readers) to access and monitor vital server statistics so that server problems can be detected quickly. The health information can be stored on the server, sent to a remote storage device or communicated directly to the user workstation.

Remote ID LED control—Service processors allow the administrator to turn on or off the server's identification (ID) LED, which can be used to identify a specific server in a rack of multiple similar servers. This is especially useful when maintenance is needed on a server and the local technician who has physical access to the server does not have access to server information. In that case, the administrator can turn on the ID LED to visually designate for the local technician which server needs maintenance.

Local and server-based authentication—In order to access the service processor features, a user needs to log in to it first. The user database is usually stored locally in the service processor. Some service processors can also communicate with central authentication server mechanisms, such as LDAP and Active Directory.

Data encryption—The communication between the service processor and the user may be encrypted if the service processor supports communication protocols that allow for encryption, such as Secure Shell (SSH) or Secure Socket Layer (SSL). Most recent service processors support some level of data encryption.

System event log (SEL)—Service processors can store information about events related to the server hardware, such as chassis opening and closing, hard drive functional alarms, RAM test errors and so on. Those event logs can then be verified by the server administrators directly, or be used as the source for automated alerts.

Platform Event Traps (PET)—Service processors can be programmed with information about critical thresholds for server environmental variables, such as the maximum operating temperature, minimum CPU fan speed, etc. Based on those thresholds, it can then send out alerts (traps) to a management system, usually in SNMP format, so that the server administrator can take immediate action to remediate the issue at hand.

Data logging—Some service processors provide the ability to log the data flowing through the server's serial console, regardless of whether there is a user directly connected to that session at that time. This enables administrators to review the history of events that happened to the server before a certain issue occurred, providing a useful audit trail for change tracking and troubleshooting. Virtual keyboard/video/mouse (KVM) is similar to the Serial over Lan (SoL) feature but instead of exposing the server's text-based serial console to the user, Virtual KVM provides access to the server's graphical user interface (GUI). This is especially important for operating systems that rely heavily on their GUIs, such as Microsoft's WINDOWS® operating system.

Virtual Media—Certain service processors allow the server to access storage media such as CD-ROMs, floppy disks and even DVD-ROMs anywhere on the network—just as if they were directly attached to that server. This allows users to quickly move and copy data between their user workstations to the server (and vice versa), which is useful for emergency OS and application patch installations, as well as diagnostic testing and BIOS upgrades. Virtual Media, along with Virtual KVM, enables a true lights-out management experience using the interfaces and tools that users are already accustomed to in their daily routine.

The service processor may include a component that is often referred to as a "BMC" (Baseband Management Controller). The Avocent Corporation provides the firmware for BMCs to various major server manufacturers. Some major service processor technologies include:

HP Integrated Lights Out (iLO)
IBM® Remote Supervisor Adapter (RSA)
Dell Remote Assistant Card (DRAC)
Sun Advanced Lights Out Management (ALOM)
Sun Integrated Lights Out Management (ILOM)

Service processors are typically accessible through either a dedicated Ethernet interface (i.e., out-of-band) or a shared data Ethernet interface (i.e., sideband). Most of the features provided by service processors, as outlined above, are not new, and many of these features are available in some shape or form through other remote management solutions, such as console servers, KVM switches, IPDUs, etc. In fact, virtually all of the benefits provided by remote out-of-band management tools are available through service processors—lower Mean-Time-To-Repair (MTTR), operating cost savings and improved asset productivity. However, one key difference is that in the case of service processors, the complete feature set needed to reap those benefits is already included in the server, and furthermore is accessible through a single interface. Moreover, the single interface is Ethernet, the most ubiquitous network interface in the IT marketplace. This greatly simplifies the deployment of the remote server management infrastructure, making it easier for information technology managers to take advantage of these technologies. Additionally, the fact that service processors are embedded inside the server provides more granular and thorough visibility of the server's status, which allows for proactive and preventive management, as well as greater control of the overall server infrastructure. Features such as hardware environmental monitoring and platform event traps are a direct result of the internal presence of service processors in the server.

From the foregoing it should be appreciated that service processors can significantly improve the management of servers by reducing the Mean-Time-To-Resolve an outage. In a world where the availability demands of the IT Network are gradually rising each year, the need to diminish the impact of outages is becoming more and more important. And while the costs of servers may be dropping slightly each year, the cost of data center management has a tendency to rise.

SUMMARY

This section provides a general summary of the disclosure, and is not a comprehensive disclosure of its full scope or all of its features.

In one aspect the present disclosure relates to a server comprising a host central processing unit (CPU). The host CPU may be configured to communicate with a production network to enable communications with a remotely located subsystem using the production network. A USB host system may be used which is operably associated with the host CPU. A service processor may also be incorporated in the server, which is configured to communicate with an out of band network. A service processor USB system may be operably associated with the service processor and configured to communicate with the USB host system. This enables access to at least one of an operating system or a hypervisor running on the host CPU, via the out of band network, using an Ethernet-over-USB protocol.

In another aspect the present disclosure relates to a server having a host central processing unit (CPU), where the host CPU is configured to communicate with a production network to enable communications with a remotely located subsystem using the production network. A USB host system may be included which may have a USB host subsystem and a host Ethernet-over-USB driver, both being operably associated with the host CPU. A service processor may be configured to communicate with an out of band network. A service processor USB system may be included which has a service processor USB subsystem and a service processor Ethernet-over-USB driver, both being operably associated with the service processor and configured to communicate with the USB host system. This enables bidirectional communications, via the out of band network, with at least one of an operating system or a hypervisor running on the host CPU.

In still another aspect the present disclosure relates to a system for communicating with a host CPU of a computer controlled electronic component via either one of a first network or an independent second network. The system may comprise a USB host system in communication with the host CPU of the computer controlled electronic component, the host CPU being configured to communicate with the first network. A service processor may be included in the system which is in communication with the independent second network. The service processor may have a service processor USB system for enabling the service processor to communicate with the host CPU via a Ethernet-over-USB protocol with the USB host system. This enables communications with the host CPU via the service processor and the independent second network.

In still another aspect the present disclosure relates to a method for communicating with a computer controlled electronic component having a host CPU. The method may include using a USB host system with the host CPU to enable Ethernet-over-USB communications with the host CPU. The host CPU may be used to communicate with a first network. A service processor may be used with the computer controlled electronic component to communicate with at least one sensor used for monitoring at least one of a health or performance of the computer controlled electronic component. A service processor USB system may be used to communicate with the USB host system, to thus enable access to one of an operating system or a hypervisor running on the host CPU via the service processor. An independent second network, in communication with the service processor, may be used to access the host CPU via the USB host system and the service processor USB system.

BRIEF DESCRIPTION OF THE DRAWINGS

The drawings described herein are for illustration purposes only and are not intended to limit the scope of the present disclosure in any way.

DETAILED DESCRIPTION

Figure 1:
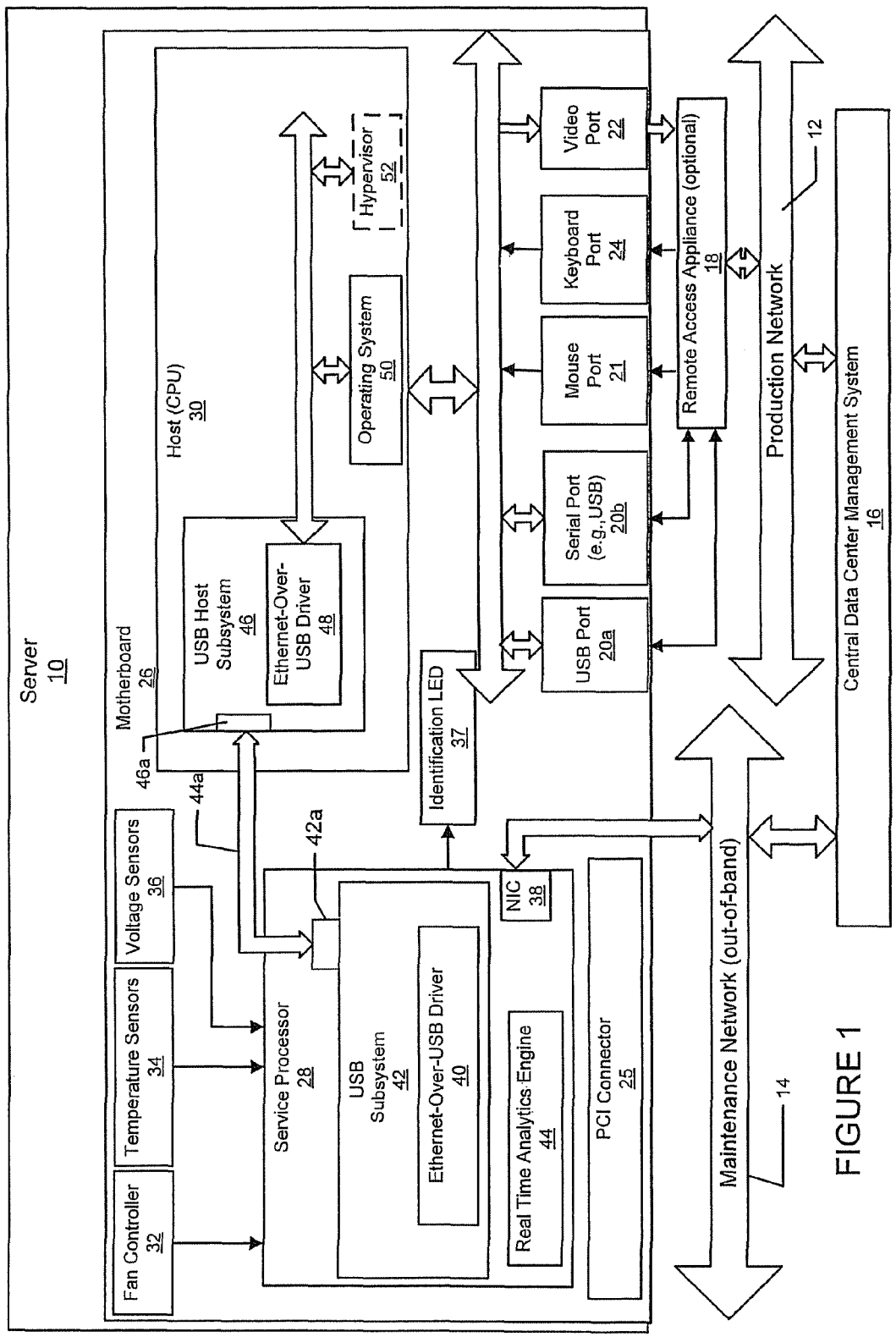
FIG. 1 is a block diagram of one implementation of a system in accordance with the present disclosure in which a service processor is connected to a motherboard of a server via a PCI connector, and coupled via a suitable cable with a USB host subsystem of a Host (CPU), where the Host (CPU) is mounted directly on the motherboard.

The following description is merely exemplary in nature and is not intended to limit the present disclosure, application, or uses. It should be understood that throughout the drawings, corresponding reference numerals indicate like or corresponding parts and features.

Referring to FIG. 1 there is shown a server 10 in accordance with one implementation of the present disclosure. The server 10 may be in communication with a production network 12 and a maintenance network 14, which may both be in communication with a central data center management system 16. The production network 12 represents the primary network by which applications access the server 10. The maintenance network 14 can be thought of as an "out of band" network by which various types of useful information may be collected from the server 10 without consuming bandwidth on the production network 12. The maintenance network 14 also forms a means by which data center personnel can gain access to the server 10 to perform power down and restarts for the server 10, in addition to other troubleshooting and maintenance work, even if the production network 12 goes down. An optional remote access appliance 18 is also shown in FIG. 1 for enabling remote access to the server 10.

The server 10 may include a USB port 20a, a serial port 20b, a mouse port 21, a video port 22, and a keyboard port 24. Any of the ports 20a, 20b, 21, 22 and 24 may be accessed via the remote access appliance 18. The server 10 may include a motherboard 26 to which a service processor 28 is connected via a PCI connector 25. A host (CPU) 30 may also be mounted to the motherboard 26. For convenience the host (CPU) 30 will be referred to throughout the following discussion simply as the "host" 30.

The motherboard 26 may include at least one cooling fan controller 32 for cooling the various components within the server 10, at least one temperature sensor 34 for sensing a temperature within various areas of the server 10, and at least one voltage sensor 36 for providing a voltage signal corresponding to at least one internal component of (e.g., power supply) of the server. In practice it will be appreciated that a plurality of fans, a plurality of temperature sensors and a plurality of voltage sensors may be included within the server 10. The signals from the fan controller 32, the temperature sensor 34 and the voltage sensor 36 may be provided to the motherboard 26 or possibly input directly to the service processor 28. An identification LED 37 may also be included which may be turned on remotely via a command sent through the out-of-band maintenance network 14 and the service processor 28, to aid a data center worker in identifying the server 10 if service or maintenance work is required on the server.

The service processor 28 may include a NIC (network interface controller) 38 which enables communication with the maintenance network 14. The service processor 28 may also include a service processor USB system 42 having an Ethernet-over-USB driver 40 which is in bidirectional communication with a USB subsystem 42. The service processor USB subsystem 42 may include a USB connector 42a. An optional real time analytics engine 44 may be included for processing the various information received from the fan controller 32, the temperature sensor 34, the voltage sensor 36, as well as information received from the host 30, as will be described in greater detail momentarily.

With further reference to FIG. 1 the USB subsystem 42 may be coupled via a suitable independent cable 44a to a USB host subsystem 46 having a host Ethernet-over-USB driver 48. The USB host subsystem 46 may be similar to the service processor USB subsystem 42 in that it may include a port 46a. The Ethernet-over-USB driver 48 may be in communication with either an operating system 50 running on the host 30, or alternatively a Hypervisor 52 that is running on the host 30. A WMI (Windows Management Instrumentation system, not shown) could also be running in the operating system 50 if the operating system 50 is a Microsoft WINDOWS® operating system.

It is a principal advantage that the USB subsystems 42,46 and the Ethernet-over-USB drivers 40,48 enable the service processor 28 to bidirectionally communicate with the software (i.e., operating system 50 or Hypervisor 52) running on the host 30. In this manner the operating system 50 or the Hypervisor 52 may communicate via their normal Ethernet processes but will be using the USB host subsystem 46 via the Ethernet-over-USB driver 48. To the operating system 50 or the Hypervisor 52, it makes no difference whether it is communicating via a typical Ethernet device, such as a NIC, or communicating via the Ethernet-over-USB driver 48 and USB host subsystem 46. The components 40, 42, 44, 46 and 48 enable transparent port forwarding between the out-of-band Ethernet maintenance network 14 and the host 30. In this manner, if a management software application needs to access the host 30, it may do so via the maintenance network 14 and the service processor 28, or via the production network 12. Thus, any information concerning the performance of the server 10 or its components, that would normally be obtainable from the host 30 using the production network 12, will be obtainable as well using the maintenance network 14. This is especially advantageous in the event that the production network 12 (or the remote access appliance 18) should go down. The changeover to the out-of-band maintenance network 14 if the production network 12 should go down may occur automatically, transparently and smoothly. The changeover from the down production network 12 to the maintenance network 14 allows continued access to the operating system 50 and the Hypervisor 52 without any action on the part of a user. The automatic changeover may be commanded by a client device receiving a "client connection failure" message from the server 10 indicating that the production network 12 has gone down and the user's network connection has been lost. Optionally, however, the changeover could be selected manually by the user from his/her client device. Still another advantage is that the management software application may use standard application programming interfaces (APIs), or Web Service in-band, to access the operating system 50 or the Hypervisor 52 when the production network 12 is not operational.

The inclusion of the real time analytics engine 44 enables information from any one or more of the fan controller 32, the temperature sensor 34 and the voltage sensors 36 to be analyzed relative to performance metrics obtained from the host 30 to gain even further intelligence as to how the server 10 is operating. For example, consider the situation where the temperature sensor 34 is configured to sense the temperature of the host 30, and the signal from temperature sensor 34 increases a significant degree, indicating the operating temperature of the host 30 has increased significantly. Without more information it may be difficult to determine if a hardware malfunction is occurring with the host 30 or if the host 30 is simply being heavily utilized during a given period of time. But since the service processor 28 is able to access and communicate with the operating system 50 or the Hypervisor web service 52, real time performance metrics concerning the utilization of the host 30 may be obtained by the service processor 28. If this information indicates that the host 30 utilization is high, then one may assume that the increase in temperature is not due to some malfunction, such as a problem with the fan controller 32. Those skilled in the art will appreciate that a wide variety of other performance metrics available from the host 30 will be highly valuable in analyzing the performance of various aspects of the server 10.

Figure 2:
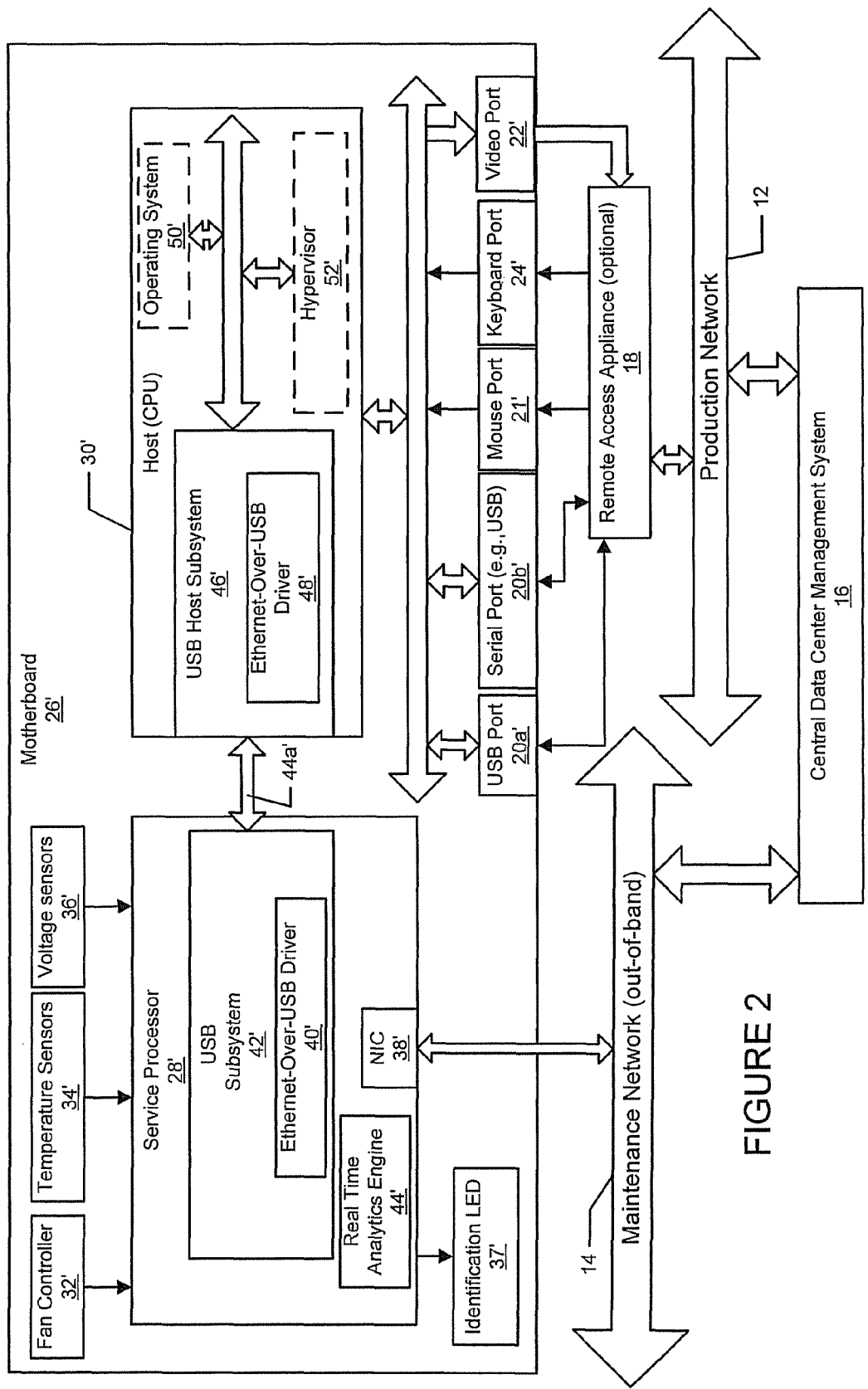
FIG. 2 is a block diagram of another implementation of the system of the present disclosure similar to that shown in FIG. 1, but with the service processor and the Host (CPU) both mounted directly on a motherboard and coupled via a suitable bus formed on the motherboard.

Referring to FIG. 2, a server 100 is shown that is similar to the server 10. Components of the server 100 in common with those of the server 10 are denoted with the same reference numbers that also include a prime (') symbol. The difference between the server 10 and the server 100 is that with the server 100, both the service processor 28' and the host 30' are directly physically mounted on the motherboard 26'. Otherwise, the operation of the various components of the server 100 is the same as that described for the server 10. Since the service processor 28' and the host 30' are both directly physically mounted on the motherboard 26', rather than using the independent cable 44a, a bus 44a' may be formed directly on the motherboard 26' to couple these two components for bidirectional communication. Accordingly, it will be appreciated that the implementation of the service processor 28 or 28' is not limited to mounting in any specific configuration within the server 10 or 100, as long as it is able to communicate with the host 30 or 30'.

Figure 3:
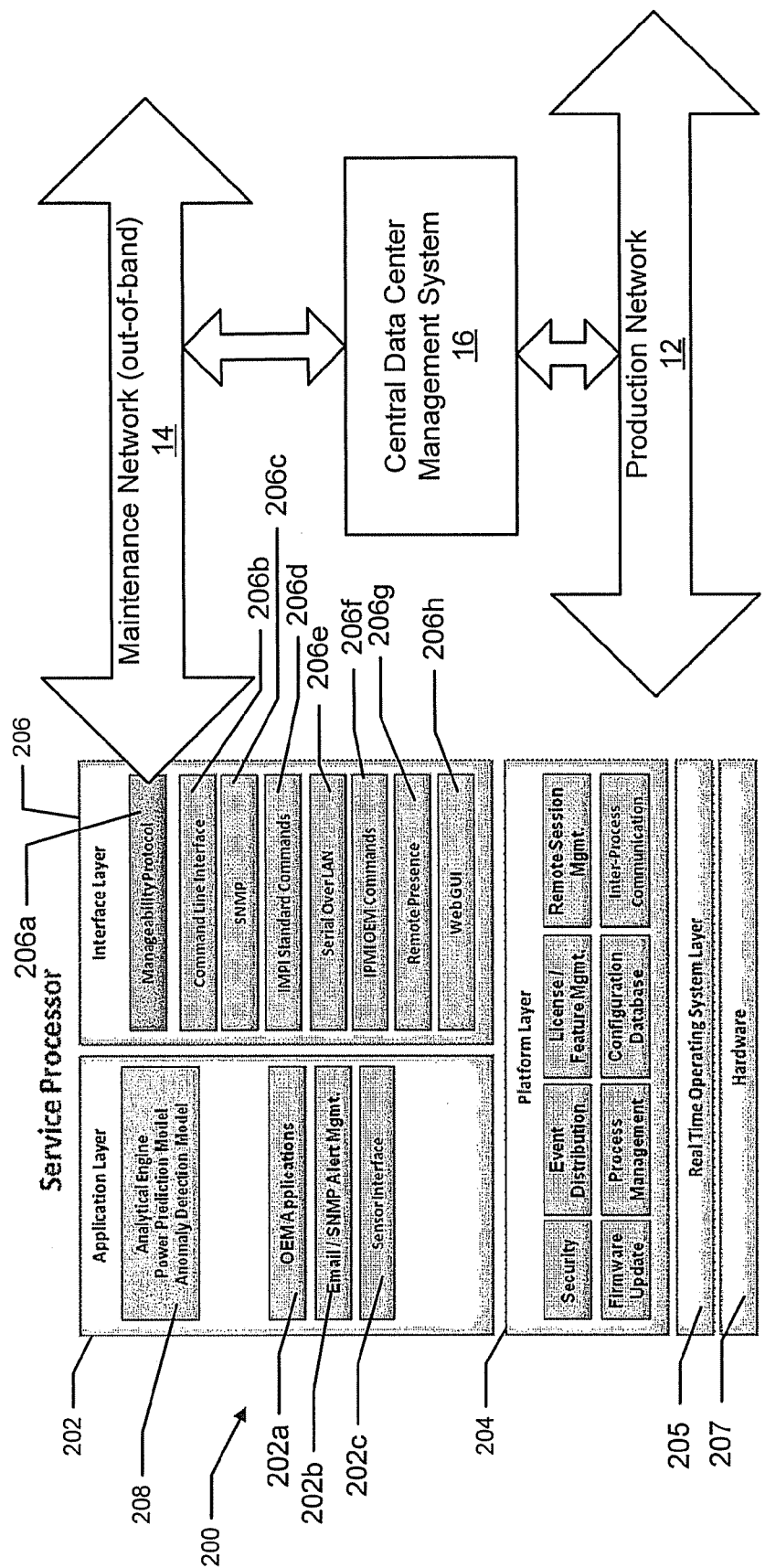
FIG. 3 is a more detailed block diagram illustrating in greater detail a service processor which includes an analytics engine having a power consumption and an anomaly detection model.

Referring to FIG. 3 an example of a service processor 200 is shown that incorporates an application layer 202, a platform layer 204 and an interface layer 206. In this example the application layer 202 includes a real time analytical engine 208 that incorporates a power consumption and anomaly detection model. The application layer 202 specifically may also include an OEM applications module 202a; Email/SNMP Alert Management module 202b and a sensor interface 202c. The interface layer 206 may include a manageability protocol subsystem 206a, a command line interface 206b, a SNMP subsystem 206c, an IMPI standard Commands subsystem 206d, a serial over LAN subsystem 206e, an IPMI OEM commands subsystem 206f, a remote presence subsystem 206g, and a Web-GUI subsystem 206h. The platform layer 204 may include a security subsystem 204a, an event distribution subsystem 204b, a license/feature management subsystem 204c, a remote session management subsystem 204d, a firmware update subsystem 204e, a process management subsystem 204f, a configuration database 204g and an inter-process communication subsystem 204h. The service processor may also include a real time operating system layer 205 and hardware 207. The power consumption and anomaly detection model 208 enables a plurality of useful features such as:

Power prediction for the entire server based on server workload (using resource utilization);

Power prediction for specified business applications;

Can provide power consumption for a specified user or for a specific task, or potentially from all applications started by a specific user);

Future capability for out-of-band anomaly detection;

Using models for event/data pattern matching;

Using IPMI and resource utilization metrics;

Predictive failure; and

Out-of-band network distribution of detected anomalous events.

It will be appreciated that other forms of machine learning may also be incorporated into the analytics engine 208 of the service processor 200 to meet changing server health monitoring needs or requirements.

While various embodiments have been described, those skilled in the art will recognize modifications or variations which might be made without departing from the present disclosure. The examples illustrate the various embodiments and are not intended to limit the present disclosure. Therefore, the description and claims should be interpreted liberally with only such limitation as is necessary in view of the pertinent prior art.

What is claimed is:

1. A server comprising:
    a host central processing unit (CPU), the host CPU configured to communicate with a production network to enable communications with a remotely located subsystem using the production network;
    a USB host subsystem operably associated with the host CPU;
    a service processor configured to communicate with an out of band network; and
    the service processor including a service processor USB subsystem having an Ethernet-over-USB driver; and
    the service processor USB subsystem coupled via a cable for direct communication between the service processor Ethernet-over-USB driver and the USB host subsystem, to enable access to at least one of an operating system or a hypervisor running on the host CPU, via the out of band network, using an Ethernet-over-USB protocol.

2. The server of claim 1, wherein the USB host subsystem includes an Ethernet-over-USB driver.

3. The server of claim 1, wherein:
    the USB host subsystem includes a first Ethernet-over-USB driver;

the service processor USB subsystem includes a second Ethernet-over-USB driver; and the cable couples the USB host subsystem for bidirectional communications with the service processor USB subsystem.

4. The server of claim 1, further comprising an analytics engine operably associated with the service processor for analyzing information received by the service processor.

5. The server of claim 1, further comprising a motherboard, and wherein the USB host subsystem and the service processor USB system are both located on the motherboard.

6. The server of claim 1, further comprising a network interface circuit (NIC) for interfacing the service processor to the out of band network.

7. The server of claim 1, wherein the service processor includes:
- an application layer;
- a platform layer;
- an interface layer for interfacing the service processor to the out of band network; and
- a real time operating system layer.

8. The server of claim 1, further comprising a central data center management system in communication with the production network and the out of band network.

9. The server of claim 1, further comprising at least a plurality of:
- a temperature sensor in communication with the service processor;
- a fan controller in communication with the service processor; and
- a voltage sensor in communication with the service processor.

10. A server comprising:
- a host central processing unit (CPU), the host CPU configured to communicate with a production network to enable communications with a remotely located subsystem using the production network;
- a USB host subsystem including a first Ethernet-over-USB driver, operably associated with the host CPU;
- a service processor configured to communicate with an out of band network; and
- the service processor including a service processor USB subsystem including a second Ethernet-over-USB driver, the USB subsystem communicating directly with the USB host subsystem via a cable coupled directly between the USB host subsystem and the service processor USB subsystem, to enable the first and second Ethernet-over-USB drivers to implement bidirectional communications, via the out of band network, with at least one of an operating system or a hypervisor running on the host CPU.

11. The server of claim 10, wherein the service processor further comprises a network interface circuit for interfacing the service processor with the out of band network.

12. The server of claim 10, wherein the service processor further comprises a real time analytics engine for analyzing information received by the service processor.

13. The server of claim 10, further including:
- a real time analytics engine;
- a fan controller;
- at least one temperature sensor; and
- the fan controller and the at least one temperature sensor both being in real time communication with the service processor and providing information to the real time analytics engine.

14. The server of claim 10, wherein the host CPU and the service processor are both mounted on a motherboard.

15. The server of claim 10, wherein:
the service processor is in communication with the host CPU via a PCI connector.

16. A system for communicating with a host CPU of a computer controlled electronic component via either one of a first network or an independent second network, the system comprising:
- a USB host subsystem in communication with the host CPU of the computer controlled electronic component, the host CPU being configured to communicate with the first network; and
- a service processor in communication with the independent second network, the service processor having a service processor USB subsystem with an Ethernet-over-USB driver, the service processor USB subsystem being in direct communication with the USB host subsystem via a cable, the cable and the Ethernet-over-USB driver enabling the service processor to communicate with the host CPU via a Ethernet-over-USB protocol with the USB host subsystem, to thus enable communications with the host CPU via the service processor and the independent second network.

17. The system of claim 16, wherein the first network is a production network and the independent second network is an out of band network.

18. A method for communicating with a computer controlled electronic component having a host CPU, the method including:
- using a USB host subsystem having a first Ethernet-over-USB driver to communicate with the host CPU to enable Ethernet-over-USB communications with the host CPU;
- using the host CPU to communicate with a first network;
- using a service processor of the computer controlled electronic component to communicate with at least one sensor used for monitoring at least one of a health or performance of the computer controlled electronic component;
- using a service processor USB subsystem having a second Ethernet-over-USB driver to communicate directly with the USB host subsystem via a cable, to thus enable access to one of an operating system or a hypervisor running on the host CPU via the service processor; and
- using an independent second network in communication with the service processor to access the host CPU via the USB host subsystem and the service processor USB subsystem.

19. The method of claim 18, further comprising using a real time analytics engine with the service processor to analyze information relating to the at least one of health or performance of the computer controlled electronic component.

* * * * *